United States Patent Office 3,355,686
Patented Nov. 28, 1967

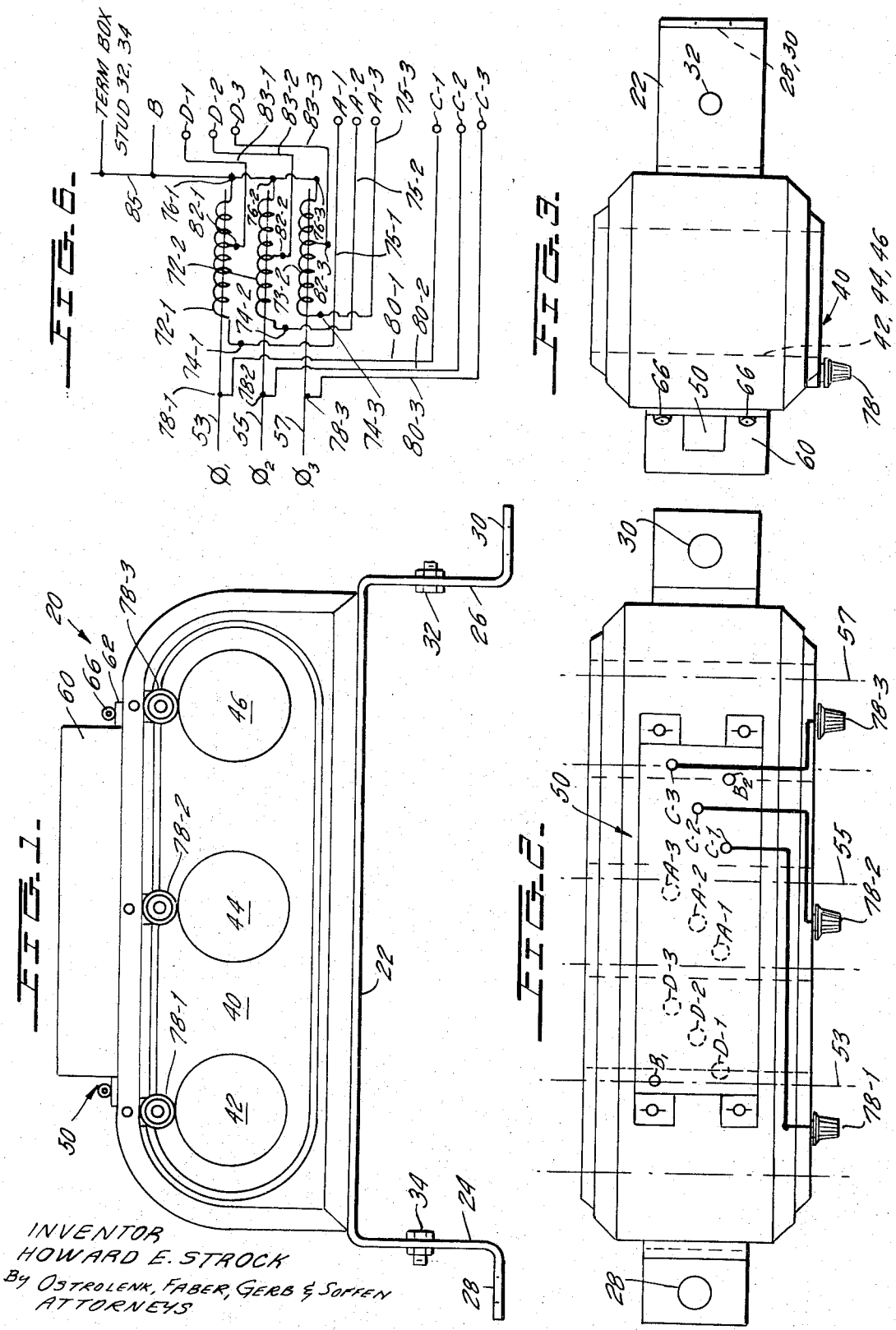

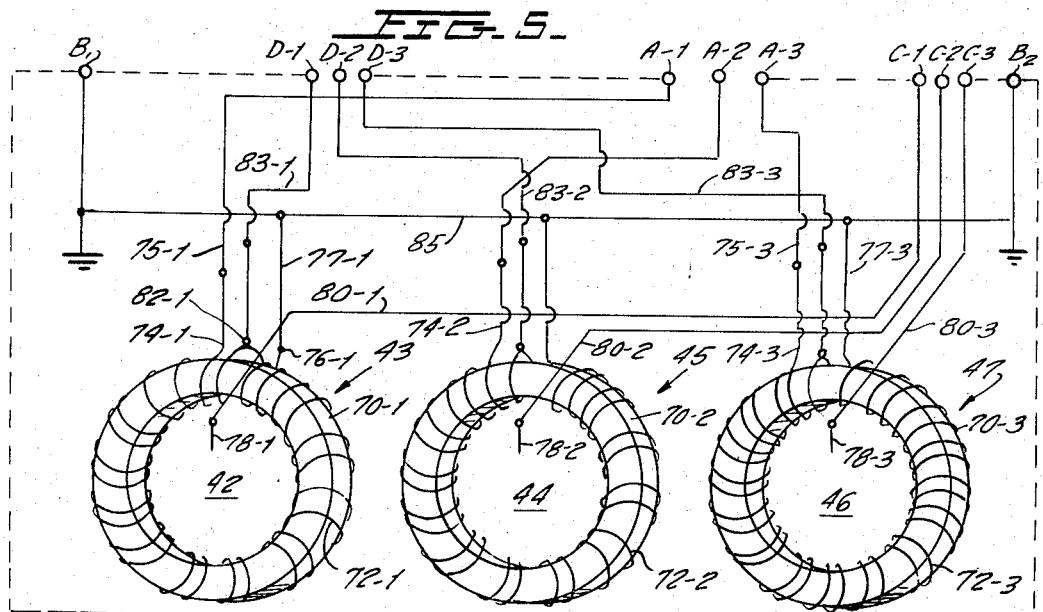
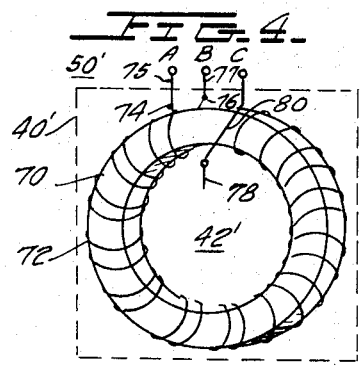
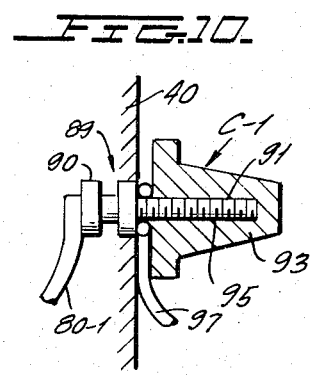
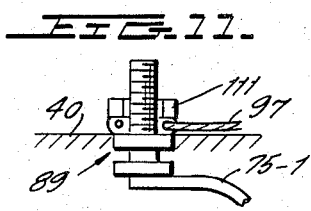
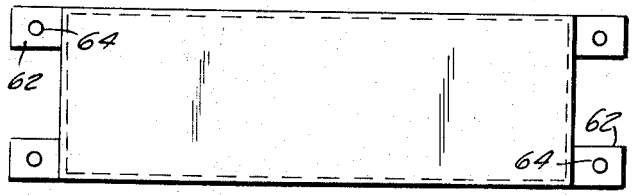
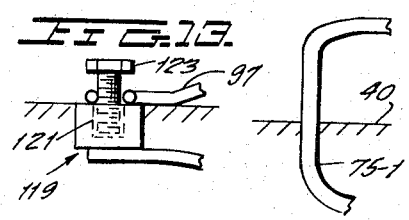
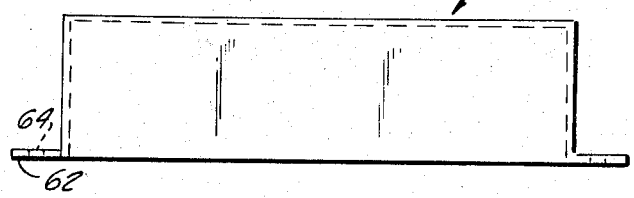
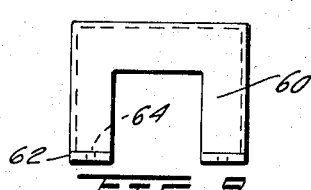

3,355,686
MOLDED CIRCUIT TRANSFORMER ASSEMBLY WITH INTERNALLY ROUTED SECONDARY CURRENT AND POTENTIAL LEADS
Howard E. Strock, Charlotte, N.C., assignor to Associated Engineering Company, Matthews, N.C., a corporation of North Carolina
Filed Mar. 22, 1965, Ser. No. 441,474
4 Claims. (Cl. 336—5)

The present invention relates to a current transformer assembly formed as an integrally molded unit, and having terminals confined to a region of the unit adapted for convenient interconnection to an external circuit. More particularly, such externally accessible terminals are circuit connected both to the secondary winding leads of the current transformer and a lead tapped to derive the potential of the incoming primary conductor.

Current transformer constructions as presently known include a magnetic core having a central opening, or window, for the reception of a primary conductor. A secondary winding is wound about the central core and is inductively coupled to the incoming primary winding. Accordingly, a current will be established within the secondary coil winding proportionally related in magnitude to the current of the primary conductor in accordance with the secondary turns ratio. Such current transformers are used to measure the magnitude of current passing through their respective primary conductors. It is, however, a basic electrical requirement in the art of electrical metering to have both an indication of the electrical current and electrical potential associated with a particular circuit. That is, should it be desired to measure the load power, as by a watt-meter or watt-hour-meter, it is necessary that such a meter have an input related to both load current and load potential.

In the present state of the art, the input to such power measuring meters is provided by singularly molded current transformer units having secondary connections at the top or side surfaces thereof. Should a three-phase system be connected, three such independent transformers are required, having a multiplicity of external wiring extending between the secondary winding leads of the current transformer and the input terminals of the monitoring meter. It is further necessary to provide potential connections, which are typically made externally at some point of the input conductor harness. This arrangement necessitates cumbersome wiring arrangements, as well as exposing the potential taps to inclement weather conditions.

This further exposes both the cumbersome current and potential wiring to weather and possible mechanical damage.

The instant invention solves this problem by providing an integrally formed unit, which is pre-wired, encapsulated and internally circuit connected to conveniently provide terminal means at a common region which may be readily circuit connected to the input terminals of a watt-meter or similar monitoring instrument. Specifically, the integrally formed unit of the instant invention includes one, two or more individual current transformers molded within a common housing, and having windows for the reception of their respective individual primary conductors. The leads of the secondary windings are circuit connected, via connecting means passing through the body of the integrally molded unit, to a common terminal region, such that all the terminals of the various current transformers are located at such a convenient region. There is also provided a connection for receiving a potential tap at the current transformer windows. The potential tap leads are similarly circuit connected, via wires passing through the insulated molded body of the integral unit, to provide potential terminals at the same common region. Accordingly, such common region includes both the current and potential terminals associated with the various input circuits.

Within the concept of the instant invention, it is contemplated that the secondary windings may be of a single turns ratio, or a dual or other multiple ratio winding assembly. The various terminals of the winding units are all brought to the common terminal connecting region, such that the required secondary current ratios, as well as the input potential taps, are conveniently routed to such a common region for external connection to a circuit.

In accordance with a preferred embodiment of the instant invention, the terminal region of the assembled unit includes a housing which serves to protect the terminals from inclement environmental conditions, electrical shock and tampering. Accordingly, should it be intended that the current transformer assembly of the instant invention be externally located, the circuit connections will be protected, as contrasted to the prior art arrangements, which have typically been subjected to such dangers.

It is therefore seen that the primary object of the instant invention is to provide an improved current transformer assembly.

A further object of the instant invention is to provide a current transformer assembly, wherein all the external circuit connections are made to a common terminal region.

Another object of the instant invention is to provide such a current transformer assembly wherein both the secondary current leads and potential tap leads are circuit connected through the insulating molded housing of the integrally formed current transformer assembly, to the common terminal region.

An additional object of the instant invention is to provide a multi-phase current transformer assembly, including window openings for the reception of the primary conductors, and a common terminal region providing access to both secondary current and potential leads.

Another object of the instant invention is to provide such a multi-phase current assembly which includes internally routed connections between a potential tap located at the windows of the respective current transformers and a terminal means located at such common terminal region.

These as well as other objects of the instant invention will readily become apparent upon a consideration of the following drawings, in which:

FIGURE 1 is a front elevation view of a three-phase current transformer assembly constructed in accordance with the novel concepts of the instant invention.

FIGURES 2 and 3 are plan and end views respectively of the assembly shown in FIGURE 1.

FIGURE 4 is a simplified schematic drawing showing the current and potential wiring of a single phase, single winding unit.

FIGURE 5 is a simplified schematic representation showing the circuit connections between the secondary windings and potential tap of a three-phase dual ratio assembly of the type shown in FIGURES 1–3.

FIGURE 6 is a typical circuit schematic showing the circuit connections of the unit shown in FIGURES 1–3 and 5.

FIGURES 7, 8 and 9 are side, top and end views respectively of the terminal protective cover which may advantageously be located coextensive with the circuit connection region of the current transformer assembly.

FIGURE 10 is one form of the molded terminal conductors, which may be utilized in conjunction with the invention.

FIGURES 11–14 show alternative forms of the terminal conductors.

Referring initially to FIGURES 1–3, current transformer assembly 20 includes a mounting bracket 22, having L-shaped end sections 24, 26 respectively. Mounting apertures 28, 30 are provided at the foot thereof for mounting of the assembled unit 20 to an appropriate base member (not shown). Mounting base 22 is formed of a conductive member, such as galvanized steel, and preferably includes grounding studs 32, 34 for connection to circuit ground.

The main portion of the current transformer assembly 20 includes an integrally formed molded housing 40. Housing 40 may be molded of numerous types of conventional electrical insulating encapsulating materials, such as butyl rubber, ethylene, propylene, copolymer rubber, ethylene propylene terpolymer rubber, epoxy resin, polyethylene, polyester resins, polycarbonates, or suitable compounds thereof as well as appropriate plastic molding electrical insulating material. Housing 40 includes openings 42, 44, 46 which are in alignment with the windows of their respective current transformers 43, 45, 47 (as best shown in FIGURE 5). The individual current transformer units 43, 45, 47 may typically be of the general type shown in my U.S. Patent No. 2,925,570 entitled, "Current Transformer," and issued Feb. 16, 1960. As will be more fully discussed in conjunction with FIGURE 5, the current transformers each include a magnetic core about their respective windows 42, 44, 46, with there being an appropriate secondary winding wound about such core. In accordance with the instant invention, the leads of the secondary windings are directed internally through the electrical insulating molded housing 40 and terminate at a common region 50 of the assembly 20, typically shown as a plurality of terminals at the top of the assembly. That is, these terminals at the region 50 of the current transformer assembly 20 are circuit connected to the output leads of the respective current transformers 43, 45, 47 which are integrally encapsulated within molded housing 40.

The windows 42, 44, 46 receive primary conductors as shown dotted by 53, 55, 57 respectively. A potential tap is made into the input primary conductors, as for example by the device (not shown) which is the subject of my U.S. Patent No. 3,146,053 entitled, "Potential Tap Device," and issued Aug. 25, 1964. Potential tap receiving members 78–1, 78–2 and 78–3 are located adjacent windows 42, 44, 46, respectively. These members are in turn circuit connected to potential terminals located at the common region 50.

A protective cover 60 which is shown in detail in FIGURES 7–9 may be located coextensive with the circuit terminal connection region 50 of the unit assembly. Protective cover 60 includes feet 62 having apertures 64, which mate with similarly placed apertures of the molded housing for receiving securing bolts 66. The inclusion of such a cover is particularly desirable where it is intended that the current transformer assembly 20 is to be mounted outdoors. Further a lock (not shown) may be provided in conjunction with such cover to prevent tampering with the external wiring connections to the meter.

It is thus seen that unit 20 provides an integral assembly wherein the input primary conductors 53, 55, 57 pass through windows 42, 44, 46 of the assembly, with there being a potential tap being made to the input conductors at the vicinity of the windows, and all the secondary current terminal leads and potential leads are circuit connected to terminals at a common region 50 of the assembly.

Reference is now made to FIGURE 4 which schematically shows the current and potential wiring within the molded housing 40' of a simplified current transformer assembly constructed in accordance with the instant invention. This is a single phase, single winding unit, having a windowed opening 42' for the reception of a single primary conductor in the conventional manner. An annular magnetic core member 70 circumscribes the windowed opening 42' and has a single secondary winding 72 coiled thereabout. Winding 72 has secondary current leads 74, 76 at its opposite ends. Current leads 74, 76 are in turn circuit connected via lines 75, 77 respectively to externally accessible secondary current terminals A and B. There is also provided a potential tap receiving means 78, integrally molded into the housing 40' in the vicinity of window 42'. Potential tap receiving means 78 is in turn circuit connected via line 80 to externally accessible potential tap C. Thus, all the secondary current leads as well as the potential lead is available at a common external region 50' of the molded housing 40'.

Reference is now made to FIGURE 5, which shows the electrical portion of a three-phase assembly of the type shown in FIGURES 1–3, and incorporating the internally routed connections as shown in simplified FIGURE 4; as well as FIGURE 6 which is an electrical schematic showing the wiring as a typical three-phase four-wire Y with a solidly grounded neutral connection. Each of the individual current transformer constructions 43, 45, 47 are basically similar. Accordingly, for the sake of brevity, only transformer member 43 will be discussed in detail. However, corresponding parts and circuit connections of the other phase transformers are indicated by like numerals having the –2 and –3 suffix respectively.

The secondary winding 72–1 is shown as a dual ratio winding having end current leads 74–1, 76–1 and a center tap current lead 82–1. Current lead 74–1 is connected via an internally routed circuit connection 75–1 to the externally accessible current terminal A–1. Similarly, the center tap terminal 82–1 is connected via internally routed circuit connection 83–1 to an externally accessible current terminal D–1. Current lead 76–1 is connected via internally routed circuit connection 77–1 to a common neutral line 85, with such neutral line being brought out to the common terminal region 50 as a pair of terminals shown as B–1 and B–2, respectively. The potential tap lead 78–1 is connected via internally routed circuit connection 80–1 to its externally accessible potential lead C–1. Accordingly, region 50 includes all the circuit and potential terminals which may typically be used for connection to a watt-meter.

It should naturally be understood that the particular arrangement of current transformers and wiring interconnections is only typical, with the idea of the instant invention being similarly applicable to both simple and multiple ratio current transformers of any appropriate number, and internally wired in accordance with the desired system application.

Reference is now made to FIGURE 10, which shows a typical terminal construction which may be used at the potential terminal C–1 or in conjunction with the potential tap receiving means 78–1. A conductive insert 89 is shown integrally molded within the housing 40. One end of circuit connection 80–1 is connected to the internally located portion 90 of insert 89, as by brazing or soldering. Insert 89 also includes an upstanding threaded post member 91 projecting outward of the molded housing.

An insulator cap member 93 having an internally threaded aperture 95 to mate with threaded post member 91 is provided. The external circuit connection 97 is placed about stud 95 and insulator cap 93 is rotated downward in the well known manner to provide a firm electrical connection therebetween. FIGURE 11 shows a slightly modified embodiment wherein the insert member 89 molded within housing 40 is of the same general type shown in FIGURE 10, but includes a cooperating nut 111 instead of insulated cap 93. A combination of the insulating cap and nut may be used.

FIGURE 12 shows an alternative construction which may be used for the potential or secondary current terminal connections. An L-shaped member 99 is shown having a first portion 101 molded into housing 40 and a forward portion 103 projecting therefrom. The internally located circuit connection, such as 75-1, is electrically connected to portion 101. Terminal receptacle 105 is connected to the portion 103. Terminal receptacle 105 is of the well known variety including a fastening screw 107 to provide firm contact pressure with the external circuit connection 97.

FIGURE 13 shows another embodiment wherein the insert member 119 has a threaded aperture 121 for directly receiving the contact pressure screw 123.

FIGURE 14 shows still another form of an extremely simplified arrangement wherein the internally routed connecting lead, such as 75-1, formed of a solid or flexible wire, extends out of molded case housing 40, for the circuit connection to be made directly thereto.

It is, therefore, seen that the instant invention provides an extremely convenient current transformer assembly wherein one or more individual units may be molded together into an integral housing, with all the terminal leads therefrom being internally connected to a common terminal region of the assembly. This advantageously avoids excessive time and labor costs for field installation, eliminates the external harness previously required to connect the potential and current leads together, provides improved mechanical protection over the external harness, and increased electrical protection against shorting since the electrical connections are in the electrical insulating molding.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. In a current transformer assembly having a molded insulating housing, the combination of at least one current transformer integrally molded within said housing, said current transformer including a magnetic core having a central opening for receiving a primary conductor, a secondary winding carried on said magnetic core and including at least first and second current leads, a potential tap receiving means located at said central opening for receiving a potential lead tapped into the primary conductor, a common terminal region of said assembly including a plurality of terminal means adapted for connection to an external circuit, said common terminal region including current terminal means circuit connected to said current leads and a potential terminal means circuit connected to said potential lead, first circuit connecting means integrally molded within said housing for circuit connecting said current terminal means to the respective ones of their secondary winding leads, and second circuit connecting means integrally molded within said housing, and routed between said central opening and common terminal region, for circuit connecting said potential tap receiving means to said potential terminal means, whereby said terminal means provide a common region of external circuit access to both the current and potential leads for measuring power consumption.

2. In a current transformer assembly having a molded housing, the combination of a plurality of current transformers integrally molded within said housing, each including a magnetic core having a central opening for receiving a primary conductor, a secondary winding carried on said magnetic core and including at least first and second current leads, a potential tap receiving means located at said central opening for receiving a potential lead tapped into the primary conductor, a common terminal region of said assembly including a plurality of terminal means adapted for connection to an external circuit, said common terminal region including current terminal means circuit connected to the individual current leads of each of said plurality of current transformers, and potential terminal means circuit connected to the individual potential leads of each of said plurality of current transformers, first circuit connecting means integrally molded within said housing for circuit connecting said current terminal means to the respective ones of their secondary winding leads, and second circuit connecting means integrally molded within said housing, and routed between said central opening and common terminal region, for circuit connecting said potential tap receiving means to said potential terminal means, whereby said terminal means provide all the external circuit access to both the current and potential leads at a common region.

3. In a current transformer assembly integrally molded together within a housing to define a single unit, at least a first, second and third current transformer, each including a magnetic core having a central opening for receiving a primary conductor, such that said housing including first, second and third openings for receiving the primary conductors of a three-phase system; a secondary winding carried on each of said magnetic cores and including at least a first and second current lead for each phase; a potential tap receiving means located at each of said central openings for receiving a first, second and third potential lead tapped into their respective primary phase conductors; a common terminal region of said assembly including a plurality of terminal means adapted for connection to an external circuit, said circuit connection region including current terminal means circuit connected to individual first and second leads of each of the phases, and potential terminal means circuit connected to the individual potential leads of each of the phases, first circuit connecting means integrally molded within said housing for circuit connecting said current terminal means to the respective ones of their leads and second circuit connecting means integrally molded within said housing, and routed between said central opening and common terminal region, for circuit connecting said potential tap receiving means to said potential terminal means, whereby said terminal means provide a centralized region of external circuit access to both the current and potential leads of each of said phases.

4. In a current transformer assembly as set forth in claim 3 each of said current transformers having an additional current lead circuit connected to an additional secondary winding, said current terminal means including additional terminal means circuit connected to individual ones of said additional current leads via additional circuit connecting means integrally molded within said housing.

References Cited

UNITED STATES PATENTS

| | | | |
|---|---|---|---|
| 1,988,733 | 1/1935 | Helgason | 336—107 X |
| 2,702,876 | 2/1955 | Moog | 336—96 X |
| 2,924,796 | 2/1960 | Stauber et al. | 336—174 X |
| 3,024,434 | 3/1962 | Carson | 336—174 X |

LEWIS H. MYERS, *Primary Examiner.*

T. J. KOZMA, *Assistant Examiner.*